UNITED STATES PATENT OFFICE.

LITTLETON DANIEL, OF MONTGOMERY, ALABAMA.

IMPROVEMENT IN MEDICAL COMPOUNDS.

Specification forming part of Letters Patent No. 209,331, dated October 29, 1878; application filed June 19, 1878.

*To all whom it may concern:*

Be it known that I, LITTLETON DANIEL, of Montgomery, in the county of Montgomery and State of Alabama, have invented certain new and useful Improvements in Medicine; and I do hereby declare the following to be a full, clear, and exact description of the invention, such as will enable others skilled in the art to which it pertains to make and use it.

My invention relates to an improvement in medicines; and it consists in the combination of certain ingredients, that will be more fully described hereinafter, whereby cancers, tumors, wens, carbuncles, and all classes of obstinate sores are cured or greatly benefitted.

In compounding this medicine, I take of chloride of zinc, blood-root, and kerosene-oil equal portions in bulk, but not in weight, and make a salve. I use kerosene-oil according to the condition of the sore or ulcer—the harder the sore the more oil it requires. When the sore is raw or running use less oil.

I invariably use all three ingredients, and never one or two without the others. They must be combined together to be effective; and, when applied to the surface of the affected part, will effect a cure in all cases, even when the disease has affected the bone. When the bone has been affected it will cause the diseased portion of the bone to scale off.

Having thus described my invention, I claim—

A medicine for the treatment of cancers, tumors, wens, carbuncles, and all obstinate sores, composed of chloride of zinc, blood-root, and kerosene-oil, in or about the proportions specified.

In testimony that I claim the foregoing I have hereunto set my hand this 11th day of June, 1878.

LITTLETON DANIEL.

Witnesses:
G. D. NOBLE,
C. C. CURTIS.